United States Patent

Lewis

[15] 3,702,017
[45] Nov. 7, 1972

[54] POULTRY STUNNING APPARATUS
[72] Inventor: Ernest E. Lewis, Flowery Branch, Ga.
[73] Assignee: Gainsville Machine Company, Inc., Gainsville, Ga.
[22] Filed: Dec. 17, 1970
[21] Appl. No.: 98,993

[52] U.S. Cl. .................................17/11, 17/1 E
[51] Int. Cl. .....................................A22c 21/00
[58] Field of Search ..............17/11, 1 E; 43/98

[56] References Cited

UNITED STATES PATENTS

| 3,564,645 | 2/1971 | Brugman | 17/11 |
| 3,474,490 | 10/1969 | Groover et al. | 17/11 |
| 1,949,985 | 3/1934 | Weber | 17/1 E |

FOREIGN PATENTS OR APPLICATIONS

| 1,521,982 | 3/1968 | France | 17/11 |

*Primary Examiner*—Samuel Koren
*Assistant Examiner*—J. F. Pitrelli
*Attorney*—Newton, Hopkins & Ormsby

[57] ABSTRACT

Method and apparatus for stunning poultry as they are moved along a predetermined path in a poultry processing operation. The stunning apparatus includes an upwardly open reservoir means detailed for containing a predetermined amount of liquid. An upwardly inclined ramp means is connected to one edge of the reservoir means. The inclined ramp means includes an upper surface detailed in flow communication with the reservoir means. The stunning apparatus includes shield means extending upwardly from opposite sides of the reservoir means and the inclined ramp means to define an upwardly open channel therebetween. A supply conduit including automatic valve control means is provided for maintaining liquid in the reservoir means at a predetermined level. The reservoir means includes pump means for delivering liquid under pressure to sprayer means which are supported along opposite sides of the reservoir means and adjacent the inclined ramp means. The reservoir and the inclined ramp means are supported at a predetermined location above a supporting surface by support means. Electrical insulator means are provided between the support means and the reservoir and inclined ramp means. The stunning apparatus is supported at a predetermined location relative to a poultry conveying apparatus whereby poultry conveyed by the conveying apparatus will pass through the stunning apparatus. One terminal of an electric current circuit is connected to the conveying apparatus and the other terminal of the electric current circuit is connected to the poultry stunning apparatus whereby poultry passing therethrough will be stunned due to the completion of the electric circuit between the conveying apparatus and the stunning apparatus through the poultry by the spraying of the electrical conducting liquid contained in the reservoir means onto the poultry as they are conveyed along the predetermined path.

13 Claims, 4 Drawing Figures

3,702,017

PATENTED NOV 7 1972

INVENTOR.
ERNEST E. LEWIS
BY
Newton, Hopkins, & Ormsby
ATTORNEYS

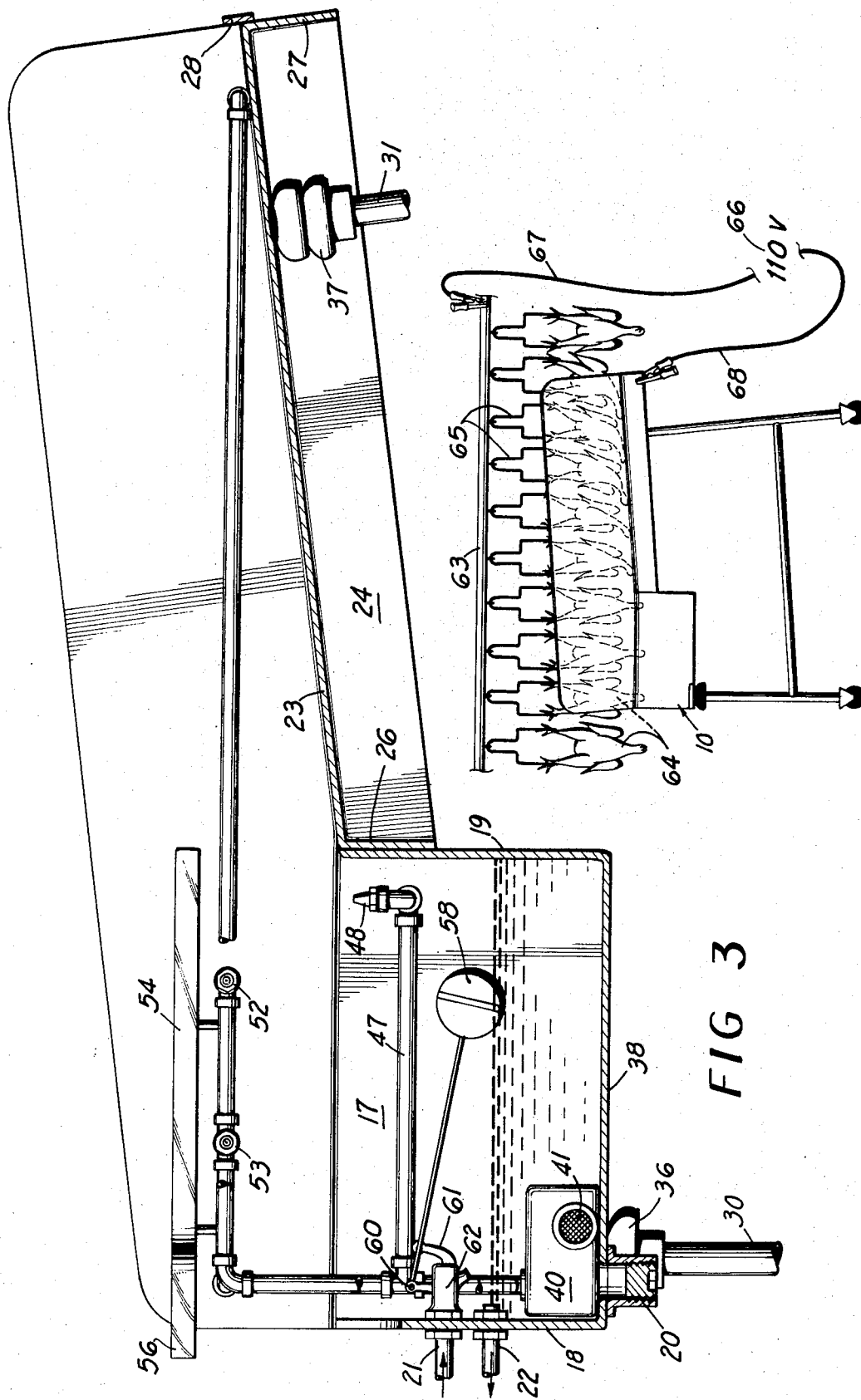

POULTRY STUNNING APPARATUS

BACKGROUND OF THE INVENTION

This invention relates to a method and apparatus for use in stunning poultry as they are moved along a predetermined path in a poultry processing operation. More particularly, this invention includes apparatus for applying an electrical charge to the poultry as they are moved along the predetermined path such that the poultry will be stunned by the electric current passing through the body of the poultry.

In poultry processing operations, the poultry is stunned before they are killed. There have been numerous devices provided for applying an electrical shock to poultry for a stunning operation. One of these devices included a series of electrical conducting wires which project laterally form a support apparatus with the wires supported and detailed for contacting poultry as they are moved along a predetermined path whereby an electrical current will flow from the conducting wires through the body of the poultry.

Another type of the prior art electrical stunning apparatus includes a rotary brush which is detailed for contacting poultry as they are moved along a predetermined path. The prior art rotary brush apparatus is constructed of an electrical conducting material and detailed such that an electrical current will flow through the brush and through the poultry as the poultry is moved along a predetermined path by conveying apparatus.

In the prior art electrical poultry stunning apparatus, the electrical charges are not effectively transmitted, either through the conducting wires or the rotary brush. Therefore the poultry would fail to be stunned. This problem is caused by heavy feathering on the poultry.

Another problem of the prior art poultry stunning apparatus would be undesirable damage to certain body portions of the poultry. This is caused by the detail in design to ensure proper electrical contact between the wires or the rotary brush and the poultry.

The prior art poultry stunning apparatus is often complex in construction, uneconomical to manufacture and unreliable in operation.

SUMMARY OF THE INVENTION

It is therefore a primary object of this invention to provide an automatic poultry stunning apparatus which will effectively stun poultry as the poultry is conveyed along a predetermined path.

Another object of this invention is to provide a poultry stunning apparatus which is operable by the application of an electrically charged fluid conducting medium to the body portion of poultry.

A further object of this invention is to provide poultry stunning apparatus which is operable by the application of an electrically charged brine solution to the poultry.

A still further object of this invention is to provide poultry stunning apparatus for spraying an electrically charged conducting solution onto poultry as the poultry is moved along a predetermined path.

Another object of this invention is to provide poultry stunning apparatus which is operable by the completion of a circuit between a poultry stunning apparatus and a poultry conveying apparatus by the application of an electrically charged fluid conducting medium to the poultry as they are moved along a predetermined path.

A further object of this invention is to provide poultry stunning apparatus which will effectively stun poultry without damaging any of the body portions of the poultry.

Still another object of this invention is to provide means for automatically controlling the level of an electrical conducting fluid medium within a poultry stunning apparatus.

A further object of this invention is to provide poultry stunning apparatus which is operable by the connection of one terminal of an electric power source to a poultry conveyor means and connection of the other terminal of said electric power source to the poultry stunning apparatus.

A still further object of this invention is to provide a method of stunning poultry by the application of an electrically charged fluid conducting medium to poultry as they are moved along a predetermined path.

Another object of this invention is to provide poultry stunning apparatus which is simple in construction, economical to manufacture and reliable in operation.

Still other objects and advantages of the details of construction will become apparent upon reading the accompanying description of one illustrative embodiment of the invention with reference to the attached drawings wherein like reference characters have been used to refer to like parts throughout the several figures and wherein:

BRIEF DESCRIPTION OF THE DRAWINGS

FIG. 3 is a vertical cross sectional view taken longitudinally through the stunning apparatus, with certain pipe sections shown broken away for purpose of clarity; and FIG. 4 is an elevational side view of the stunning apparatus shown in combination with a poultry conveyor means and showing poultry passing through the stunning apparatus.

DESCRIPTION OF THE ILLUSTRATIVE EMBODIMENT

Figure 1:
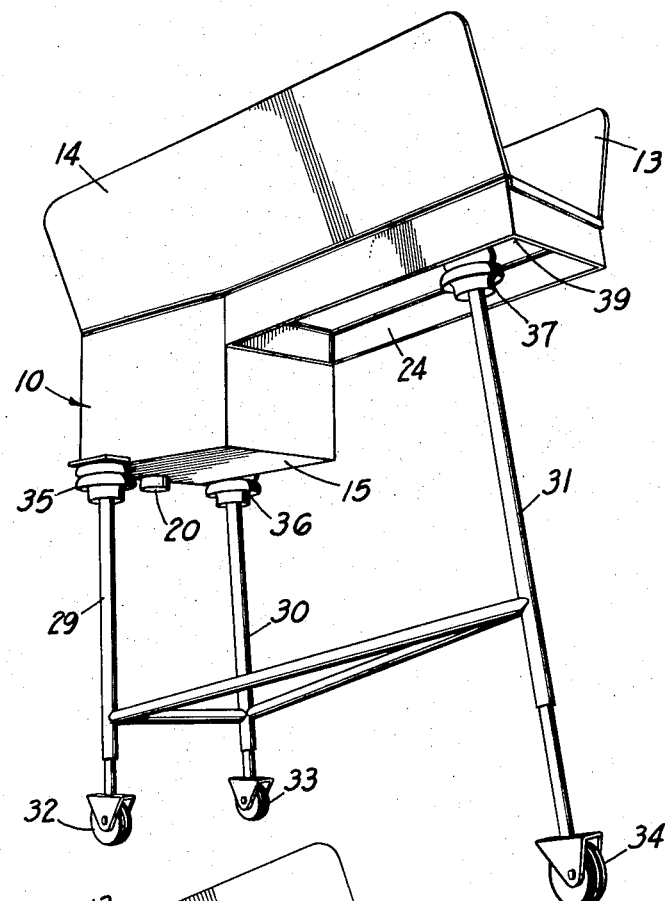
FIG. 1 is a perspective view of the under portion of the stunning apparatus.

Referring to the drawings, the numeral 10 is used to generally represent the poultry stunning apparatus. The apparatus 10 is composed of a reservoir 11, an inclined ramp 12, and spray shield means 13, 14. The reservoir 11 includes an elongated substantially rectangular body having a base 15. Connected to base 15 along the two side edges are a pair of upstanding side wall supports 16, 17. The ends of the reservoir 11 are enclosed by upstanding end members 18, 19. End member 18 includes a notched portion at its top edge. The stunning apparatus 10 is oriented relative to a poultry conveying means, as will be described in more detail herein below, such that the end member notched portion will define an entrance end for the poultry as they are conveyed along a predetermined path. Extending through the end member 18 is a supply conduit 21 and an overflow pipe 22. Communicating with the interior of the reservoir 11 is a drain 20 located in support base 15 near the end member 18.

Connected to end member 19 is an inclined ramp 12. Ramp 12 includes an elongated substantially rectangular body having a top 23. The inclined ramp top 23 includes side wall 24 and 25 and end members 26, 27, projecting downwardly therefrom. The inclined ramp 12 is secured to the reservoir 11 along end member 26, by conventional means such as welding (not shown). The ramp 12 gradually slopes upwardly from reservoir 11 and the top portion 23 thereof is in flow communication with the reservoir 11 such that liquid material introduced onto the top portion will flow by gravity therealong and into the reservoir 11. Connected to and extending along the top edge of the end member 27 is a raised lip 28. The purpose of the lip 28 is to prevent liquid introduced onto the top portion 23 from flowing over the upper extended end of the top portion 23.

The apparatus 10 is supported by three legs 29, 30, and 31 having rollers 32, 33 and 34, respectively, on their bottom ends for movably supporting the apparatus 10 on a supporting surface. Electrical insulator members 35, 36, and 37 are attached to the tops of the legs 29–31, respectively. The insulators 35, 36, and 37 are secured between the top of the legs and the bottom 38 of the support base 15 and the bottom 39 of the inclined ramp 12. Insulators 35, 36, and 37 are constructed of a conventional nonconducting material to prevent an electrical current from flowing from the apparatus 10 into the supporting legs.

Extending upwardly from the top edges of the side walls 16, 17 of the reservoir 12 and along the edges of the side walls 24, 25 of ramp 12 are two spray shields 13, 14. Shields 13, 14 project upwardly from the apparatus 10 at an angle and define an upwardly open channel-shaped passageway.

Figure 2:
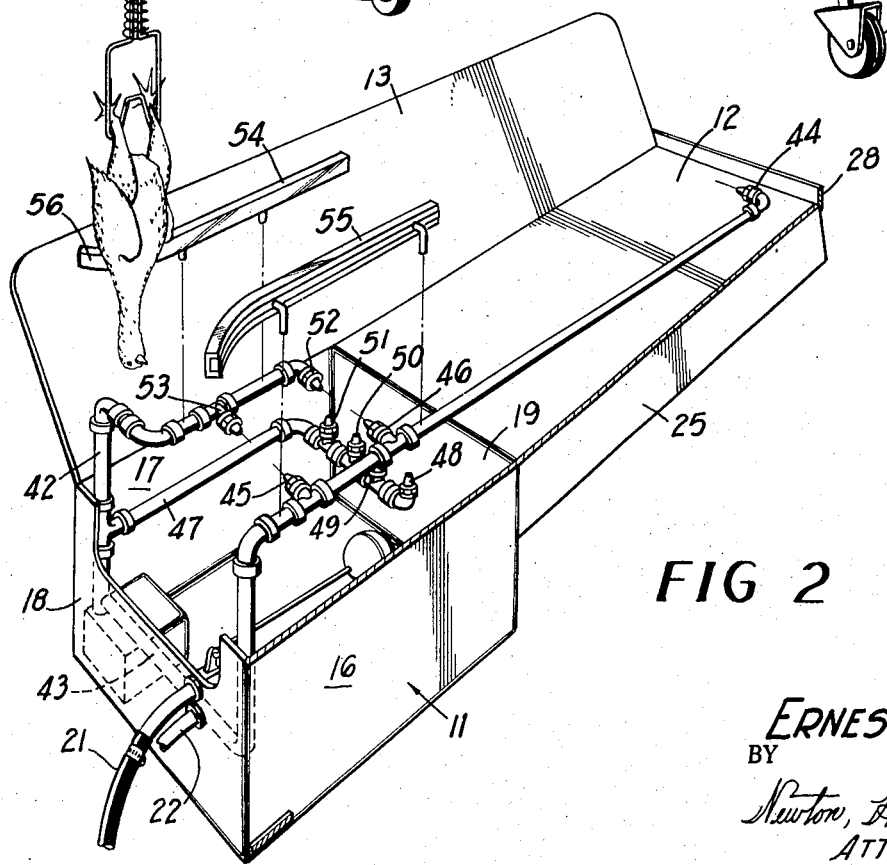
FIG. 2 is a perspective view of the top of the stunning apparatus, with exploded guide rails and with parts broken away for purpose of clarity.

As seen in FIGS. 2 and 3, the reservoir 12 includes a circulating pump 40 secured to the supporting base 15. Pump 40 includes an intake opening 41 and a supply conduit means 42. The pump 40 is located within the reservoir 12 such that the conduit 42 extends upwardly adjacent side wall 17 and adjacent one lateral edge of the notched portion of end member 18. A connecting pipe 43 is connected in flow communication with conduit 42. Pipe 43 extends laterally for a portion of its length perpendicular with pipe 42 and parallel with end member 18. Pipe 43 then curves upwardly parallel with side wall 16 and above the interior of the reservoir 11. At a point slightly above the side wall 16 pipe 43 curves to a horizontal position extending parallel with side wall 16, over the interior reservoir 11 and projects over the incline ramp 12. Pipe 43 terminates in a spray nozzle 44. Spray nozzle 44 is located adjacent the right edge of the incline ramp 12 and adjacent the upturned lip 28, as shown in FIG. 3. A pair of spray nozzles 45, 46 are connected with pipe 23 above the reservoir 11. The spray nozzles 44, 45 and 46 are oriented such that materials sprayed therefrom will be directed toward the shield means 13.

As shown in FIG. 2 the supply conduit 42 extends above the connection between pipes 42, 43 and includes a T-junction connecting member connected in flow communication with a supply pipe 47. Pipe 47 projects for a portion of its length perpendicular to pipe 42 and horizontally in alignment with side support wall 17. Pipe 47 then curves into the interior of the reservoir 11 and extends substantially parallel with end member support wall 19, terminating in a spray nozzle 48. A series of spray nozzles 49, 50 and 51 are disposed along the portion of the pipe 47 which is substantially parallel to end member 19. Spray nozzles 48, 49, 50 and 51 are oriented such that materials sprayed therefrom will be directed upwardly into the upwardly open channel area between shield means 13 and 14.

As shown in FIG. 2, the supply conduit 42 extends above the connection of pipe 47. An upwardly extended end of the pipe conduit 42 is curved to provide a substantially horizontally extending end which is disposed substantially parallel to side support wall 17. The horizontally extending portion of pipe 42 is provided with a pair of spray nozzles 52, 53. Nozzles 52, 53 are orientated such that material sprayed therefrom will be directed toward spray shield 14 and spraying nozzles 45, 46.

Secured to and projecting upwardly from the horizontal portions of pipe 42 and 43 are guide rail means 54 and 55. The guide rails 54 and 55 are connected by conventional means, such as welding, to the supply conduits 42, 43. Guide rails 44, 45 are detailed in supporting relationship relative to each other to be in substantially horizontally spaced coplanar relationship. Guide rails 44 and 45 include curved end portions 56 which are located above the notched portion of end wall 18. The guide rails 44, 45 are in substantially parallel relationship to each other over the interior of the reservoir 11 and terminate just above the top 23 of inclined ramp 12. The guide rails 54, 55, spray nozzles 45, 46, 52 and 53 define a passageway therebetween along which poultry is conveyed by the conveying means 63, as will be described in more detail herein below.

Referring now particularly to FIG. 3, the reservoir 11 is provided with an automatic fluid control means which is connected in flow communication with the supply conduit 21. The automatic fluid control means includes a float control member 58 and a connecting rod 59 secured to the float control member 58 at one end. The rod 59 is connected to a lever 60 at its opposite end. A lever 61 is provided for pivotally supporting the rod intermediate its two connected ends. The lever 60 is connected to a conventional valve control means 62 which is supported in flow communication with supply conduit 21. The float means 58 will effect automatic operation of the valve control means 62 to maintain the level of liquid in reservoir 11 at a predetermined elevation.

As shown in FIG. 4, a conveyor means 63 is provided for defining a predetermined path of movement for poultry 64. The conveyor means 63 is provided with a series of shackle members 65 vertically positioned downward from the conveyor 63 and detailed for carrying poultry 64 head down by its feet along the predetermined path. The poultry stunning apparatus 10 is oriented relative to the conveyor device 63 such that the upwardly open channel defined between the guide rails 54, 55 and spray nozzles 45, 46, 52 and 53 will be in substantially longitudinal alignment relative to the predetermined path of the poultry conveyed by the conveying device 63.

A power source 66 having two leads 67, 68 is provided for supplying an electrical charge to he stunning apparatus 10 and conveyor 63. Lead 67 is electrically connected to the conveyor means 63 and lead 68 is electrically connected to the stunning apparatus 10.

OPERATION

To begin operation of the poultry stunning apparatus 10, water will be allowed to flow through supply conduit 21 into the interior of the reservoir 11. The valve means 62 on the flow pipe 21 is left in an open position and as the water level rises within the reservoir 11, float means 58 will be carried by the surface of the water until the water reaches a predetermined elevation. When the water in the reservoir 11 reaches the predetermined elevation, the float 58 will effect operation of the valve 62 through the rod 59 and lever 60 thereby terminating the flow of water into the interior of the reservoir 11. At the predetermined elevation, the level of water in the reservoir 11 is directly below the overflow pipe 22.

After the predetermined amount of water has been accumulated in the reservoir 11, the desired amount of salt is then added to the water to make a brine salt water solution which will serve as a conductor for an electrical charge. The pump 40 is then activated and the brine salt water solution flows through the intake opening 41 up through supply pipes 42, 43 and 47 and out through spray nozzles 44, 45, 46, 48, 49, 50, 51, 52 and 53. The spray nozzle 44 sprays the solution onto the top 23 of inclined ramp 12. The solution sprayed by nozzle 44 onto the top 23 will flow down the inclined ramp 12 into the interior of the reservoir 11. The spray directed from nozzles 45–53 will be directed across the upwardly open channel, described herein above, with the spray dropping back into the interior reservoir 11. The spray shields 13, 14 will serve to retain the sprayed solution within the area immediately above the reservoir 11 and inclined ramp 12.

The power source 66 is then energized with lead 67 charging conveyor means 63, shackle member 65 and the poultry 64. Lead 68 charges the poultry stunning apparatus 10. When the conveyor means 63 is activated, the poultry 64 moves along the conveyor and the poultry 64 is guided into position above the apparatus 10 by guide rails 54 and 55. As the poultry 64 moves over the interior of reservoir 11, the brine salt water solution sprayed from nozzles 45, 46, 48, 49, 50, 51, 52 and 53 will be applied to the head and neck portion of the poultry 64, thus closing the electrical circuit between the apparatus 10 and the conveyor means 63, and the poultry 64 will become stunned by the electrical charge surging through its body.

As the poultry 64 moves further along the stunning apparatus, its head contacts the inclined ramp top surface 23. With the salt water solution, cascading down the ramp 12 from nozzle 44, acting as the conductor, the poultry 64 is further electrically shocked while it moves along the ramp 12. The ramp 12 is provided to further assure that the poultry 64 is completely stunned as it passes through the stunning apparatus 10. As the poultry 64 passes over the upturned lip 28 on the ramp 12 and away from the salt water spray, the electrical circuit is broken between conveyor 63 and the apparatus 10 and the poultry 64 no longer receives an electrical shock.

As the operation continues, the level of the solution in reservoir 11 will decrease due to saturation of the poultry passing therethrough which will retain a certain amount of the solution. When the liquid level of the reservoir 11 drops appreciably, the float member 58 will open valve 62 and allow the liquid to flow along supply conduit 21 into the interior of reservoir 11 until the predetermined level is again attained at which time the float 58 closes valve 62.

It now becomes apparent that the above described illustrative embodiment is capable of obtaining the above stated objects and advantages. It is obvious that those skilled in the art may make modifications in the details of construction without departing from the spirit of the invention which is to be limited only by the scope of the appended claims.

What is claimed is:

1. Stunning apparatus for use in stunning poultry as they are moved along a predetermined path in a poultry processing operation comprising, in combination:
   a. an electrical conducting surface detailed for contacting said poultry as they are moved along said predetermined path;
   b. means for spraying an electrical conducting fluid medium onto said poultry as they are moved along said predetermined path and for spraying said electrical conducting fluid medium onto said conducting surface; and
   c. means for applying an electrical charge to said electrical conducting medium whereby said poultry moving along said predetermined path will be stunned by an electrical current passing through the conducting medium into the body of said poultry.

2. Poultry stunning apparatus as described in claim 1 further characterized in that said poultry stunning apparatus includes an upwardly open reservoir means detailed in location relative to said spraying means for catching and retaining surplus run-off of said brine solution from said poultry.

3. Poultry stunning apparatus as described in claim 2 further characterized in that said conducting surface includes an inclined ramp means extending from one edge of said reservoir means and wherein said ramp means is detailed in incline flow relationship relative to said reservoir means whereby said solution sprayed onto said conducting surface will flow by gravity down said incline ramp means into said reservoir means.

4. Poultry stunning apparatus as described in claim 2 further characterized in that said reservoir means includes conduit means adapted to be connected in flow communication with a source of liquid and wherein said conduit means includes automatic valve control means operatively associated with said conduit means and said reservoir for maintaining the level of solution in said reservoir at a predetermined elevation.

5. Poultry stunning apparatus as described in claim 2 further characterized in that said spraying means includes a plurality of spraying nozzles and wherein certain of said spraying nozzles are located along one side of said predetermined path and wherein certain other of said nozzles are located along an opposite side of said predetermined path.

6. Poultry stunning apparatus as described in claim 3 further characterized in that said reservoir means and said inclined ramp means are provided with shield means detailed in location relative to said spraying means for retaining said sprayed solution within the area immediately above said reservoir means and said inclined ramp means.

7. Stunning apparatus for use in stunning poultry as they are moved along a predetermined path in a poultry processing operation comprising, in combination;
   a. conveyor means supported at a predetermined location and including means for conveying poultry along a predetermined path;
   b. poultry stunning means supported at a predetermined location relative to said conveyor means, said poultry stunning means including an electrical conducting surface detailed for contacting said poultry moving along said predetermined path, and means for spraying an electrical conducting fluid medium onto said poultry moving along said predetermined path and onto said electrical conducting surface;
   c. means for electrically connecting one terminal of an electrical power source to said conveyor means; and
   d. means for electrically connecting the opposite terminal of said electrical power source to said electrical conducting fluid medium, whereby an electrical current will flow through the body of said poultry due to the completion of the electrical circuit between said terminals by applying said electrical conducting fluid medium to said poultry as they are moved along said predetermined path.

8. Poultry stunning apparatus as described in claim 7 further characterized in that said poultry stunning apparatus includes an upwardly open reservoir means detailed in location relative to said spraying means for catching and retaining surplus run-off of said brine solution from said poultry.

9. Poultry stunning apparatus as described in claim 8 further characterized in that said conducting surface includes an inclined ramp means extending from one edge of said reservoir means and wherein said ramp means is detailed in incline flow relationship relative to said reservoir means whereby said solution sprayed onto said conducting surface will flow by gravity down said inclined ramp means into said reservoir means.

10. Poultry stunning apparatus as described in claim 8 further characterized in that said reservoir means includes conduit means adapted to be connected in flow communication with a source of liquid and wherein said conduit means includes automatic valve control means operatively associated with said conduit means and said reservoir for maintaining the level of solution in said reservoir at a predetermined elevation.

11. Poultry stunning apparatus as described in claim 8 further characterized in that said spraying means includes a plurality of spraying nozzles and wherein certain of said spraying nozzles are located along one side of said predetermined path and wherein certain other of said nozzles are located along an opposite side of said predetermined path.

12. Poultry stunning apparatus as described in claim 9 further characterized in that said reservoir means and said inclined ramp means are provided with shield means detailed in location relative to said spraying means for retaining said sprayed solution within the area immediately above said reservoir means and said inclined ramp means.

13. In a stunning apparatus for use in stunning poultry as they are moved along a predetermined path in a poultry processing operation comprising, in combination:
   a. an upwardly open reservoir means detailed for containing a predetermined amount of liquid;
   b. upwardly inclined ramp means connected to one edge of said reservoir means with the upper surface of said inclined ramp means being detained in flow communication with said reservoir means;
   c. shield means extending upwardly from opposite sides of said reservoir means and said inclined ramp means to define an open channel therebetween;
   d. means for maintaining a predetermined amount of liquid in said reservoir means;
   e. spraying means supported along opposite sides of said reservoir means and adjacent said ramp means;
   f. means for delivering an amount of said liquid contained in said reservoir means to said spraying means;
   g. means for supporting said reservoir means and said inclined ramp means at a predetermined location, said support means including insulator means mounted between said reservoir and inclined ramp means and said support means for providing a nonconducting material between said reservoir and inclined ramp means and said support means; and
   h. means for connecting one terminal of an electric power source to said poultry stunning apparatus.

* * * * *